United States Patent
Coffin

(10) Patent No.: US 6,258,193 B1
(45) Date of Patent: Jul. 10, 2001

(54) METHODS FOR FABRICATING LAMINATED STRUCTURES USING RUBBER TIRE PARTS

(75) Inventor: Joseph H. Coffin, La Verne, CA (US)

(73) Assignee: Tire Recycling Development Corporation, Scotia, NY (US)

( * ) Notice: Subject to any disclaimer, the term of this patent is extended or adjusted under 35 U.S.C. 154(b) by 0 days.

(21) Appl. No.: 08/031,224

(22) Filed: Mar. 12, 1993

Related U.S. Application Data

(63) Continuation-in-part of application No. 07/907,338, filed on Jul. 1, 1992, which is a continuation-in-part of application No. 07/647,277, filed on Jan. 28, 1991, now abandoned.

(51) Int. Cl.⁷ .......................... B29C 73/00; B32B 25/04
(52) U.S. Cl. .......................... 156/95; 156/94; 156/254; 156/255; 156/260; 156/264; 156/265; 428/194; 428/492; 428/493; 428/903.3
(58) Field of Search .................... 156/94, 95, 254, 156/255, 260, 264, 265, 267; 428/44, 194, 492, 493, 796, 797, 903.3, DIG. 9

(56) References Cited

U.S. PATENT DOCUMENTS

| | | | |
|---|---|---|---|
| 3,753,821 | * | 8/1973 | Ragen ..................................... 156/96 |
| 4,905,734 | * | 3/1990 | Ito ......................................... 138/126 |
| 5,096,772 | * | 3/1992 | Snyder ................................. 428/295 |

FOREIGN PATENT DOCUMENTS

| | | | |
|---|---|---|---|
| 1368772 | * | 10/1974 | (GB) .................................. 256/13.1 |
| 2950699 | * | 10/1974 | (DE) .................................. 256/13.1 |

* cited by examiner

Primary Examiner—Elizabeth M. Cole
Assistant Examiner—Ula C. Ruddock
(74) Attorney, Agent, or Firm—Heslin & Rothenberg, P.C.

(57) ABSTRACT

Methods for fabricating laminations to form structural elements of predetermined shapes (120, 220, 420, 520, 620) are provided. Laminations include parts (22, 24) fabricated from the tread portion (42) of discarded rubber tires. The parts are typically arranged in layers with various relationships therebetween. The parts are pressed to remove all voids therebetween causing dynamic tension which creates rigidity and then bonded with methods including vulcanization, chemical vulcanization, epoxy and adhesive.

6 Claims, 7 Drawing Sheets

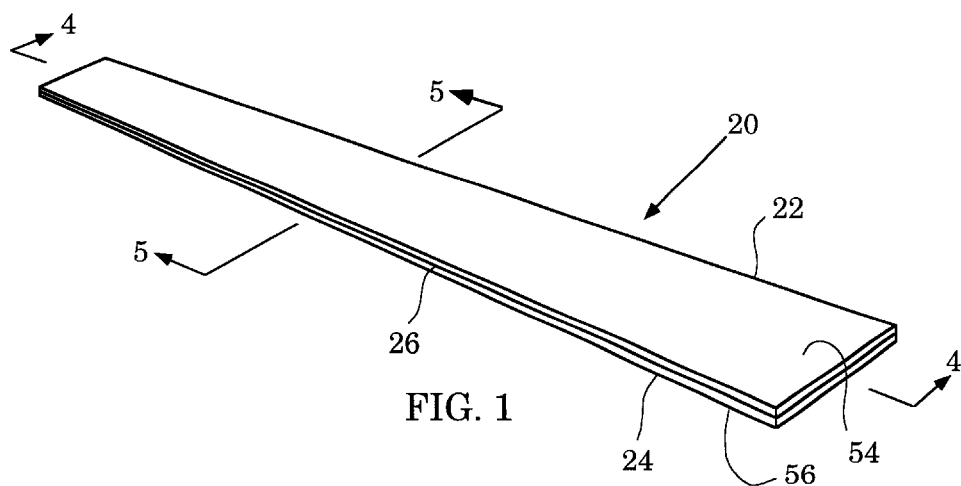
FIG. 1
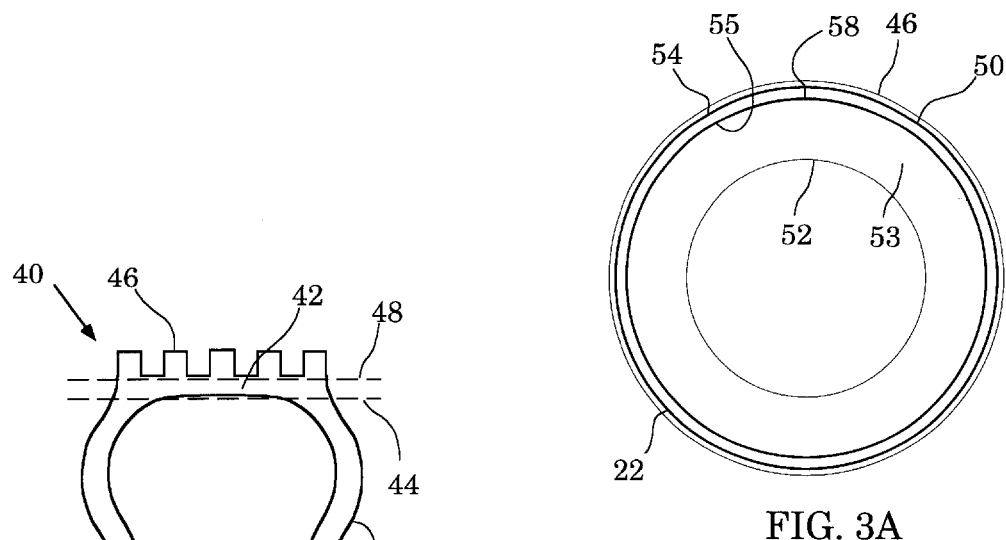
FIG. 2
FIG. 3A
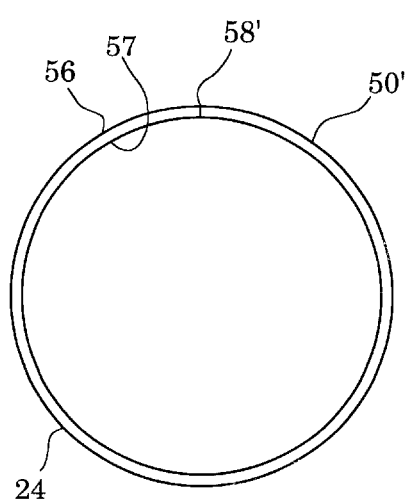
FIG. 3B

METHODS FOR FABRICATING LAMINATED STRUCTURES USING RUBBER TIRE PARTS

CROSS-REFERENCE TO RELATED APPLICATIONS

This application is a continuation-in-part of application Ser. No. 07/907,338 filed Jul. 1, 1992 pending which was a continuation-in-part of application Ser. No. 07/647,277 filed Jan. 28, 1991, now abandoned the disclosures of which are hereby incorporated by reference and made a part hereof.

TECHNICAL FIELD

The present invention pertains generally to methods for laminating structures and more particularly, to methods for laminating structures of pneumatic vehicle tire parts.

BACKGROUND ART

Discarded pneumatic vehicle tires form a considerable resource. Patents intended to utilize this resource include U.S. Pat. Nos. 292,020; 1,285,992; 3,607,982; 3,753,821; 3,803,792; 3,819,915; 3,848,85; 3,934,540; 4,030,706; 4,186,913; 4,905,734; and 4,934,426 and German Patent 2,950,699 and United Kingdom Patents 1,368,772 and 2,207,349.

DISCLOSURE OF INVENTION

The present invention is directed to methods for fabricating structures laminated of parts of tires. Structures fabricated in accordance with the invention are comprised of a plurality of opposing layers integrated by a bond with the layers comprising parts of tires.

A preferred method embodiment, in accordance with the invention, may be used to fabricate a plank structure having two layers. The parts are cut from the tread portion of pneumatic vehicle tires with the tread pattern substantially removed prior to integration into the structure. The parts are arranged in layers with their sides adjacent thereby using the opposing curvatures of the opposing parts to increase the stiffness of the structure when it is pressed together to remove voids between the parts and bonded together. Vulcanization or a strong adhesive may be used to bond the adjacent layers together.

The structure described above is achieved, in another preferred method embodiment of the present invention, by the integration of a layer whose parts comprise unvulcanized rubber. This layer is sandwiched between the adjacent layers of tire parts. The whole structure is then heated under pressure to remove all voids between the layers and to bond by vulcanization. The dynamic tension caused by the bonding of the opposing built-in tread curvatures creates a new and unexpected rigidity to the plank. The planks fabricated with the above method embodiments may be of any length. The bond may be augmented by fasteners extending through the layers.

Methods in accordance with the invention may be used to fabricate a fence or highway guard rail having a rail, similar to the planks described above, and a plurality of posts. The construction of the posts is similar to the planks with the outer sides of the posts laminated over the outer sides of the rail portion. The lamination between the rail and posts may be augmented by fasteners extending through the layers. Posts of construction similar to those in the guard rail may also be used individually.

In another preferred method embodiment, the tire parts are arranged in adjoining layers in various relationships between parts within a layer and parts of adjoining layers. These relationships include edge abutting relationships, overlapping side abutting relationships, edge offset relationships, edgewise tongue and groove relationships, and longitudinally rotated relationships. Other laminations in accordance with the invention are characterized by the arrangement of unvulcanized rubber parts in interleaved relationships with the tire parts and the use of vulcanization as a bond. Other preferred embodiments utilize an abraded surface to reduce sound reflections therefrom.

The novel features of the invention are set forth with particularity in the appended claims. It should be remembered that scrap steel belted radial tires are recognized to be nearly indestructible, as they were manufactured to be. The tire parts referenced above are not just ribbons of fabric impregnated with rubber and reinforced with steel wires. Rather, the components of these highly engineered strips have been carefully assembled and vulcanized with heat and pressure into a circular rubberized tube able to carry thousands of pounds at high speeds, over all kinds of roads, without loosing shape, when a tire is scrapped it still maintains most of this basic built-in strength and shape which is resistant to change. This invention meets that challenge encountered in seeking to transform the tire sections with these curvatures into flat useful structures such as planks, post and panels. This will be best understood from the following description when read in conjunction with the accompanying drawings.

BRIEF DESCRIPTION OF DRAWINGS

FIG. 1 is a perspective view of a lamination formed in accordance with methods of the present invention in the shape of a plank;

FIG. 2 is a sectional view of a pneumatic vehicle tire;

FIG. 3A is an elevation view of the annular tread portion of the tire of FIG. 2;

FIG. 3B is a view, similar to FIG. 3A, of the annular tread portion of a second tire;

MODES FOR CARRYING OUT THE INVENTION

Figure 4A:
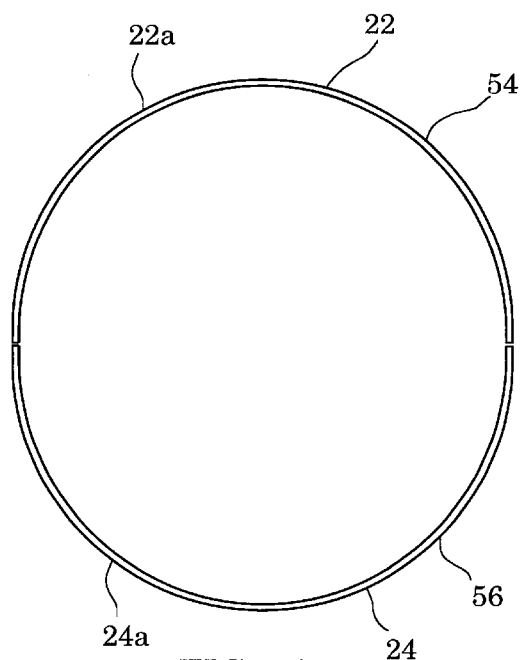
FIG. 4A is a view along the line 4—4 of FIG. 1 with tread strips 22, 24 partially opened out.

In accordance with the present invention, preferred lamination method embodiments which use parts fabricated from rubber tires to form structural elements of predetermined shapes are disclosed herein by; firstly, describing methods of forming the tire parts; secondly, describing lamination of simple elements; thirdly, describing part bonding embodiments; and, fourthly, describing lamination of more complex structural elements.

FIG. 1 is a perspective view of a preferred lamination formed in accordance with the present invention, illustrating a laminated plank 20 having two layers. In this embodiment, each layer is made up of a single part (formerly part of the tire tread) now in the form of a strip. The strip 22 is shown as the upper layer and the strip 24 is the lower layer. The strips 22, 24 are integrated by a bond along the bond line 26. Fabrication of this bond will be described after the following preliminary fabrication steps have been disclosed.

The strip 22 is fabricated from a pneumatic vehicle tire 40 having cord-reinforced belt plies, as shown in FIG. 2 and FIG. 3A which are, respectively, cross section and elevation view of the tire 40. In FIG. 2 the annular tread portion 42 of the tire 40 is removed with an annular cut substantially along the line 44. The sidewalls 53 ending in beads 52 are discarded.

The tire piece in the form of a rim 50, produced by the annular cut described above, with first side 54 and second side 55 is shown in FIG. 3A. A transverse cut along the line 58 allows the tread portion 42 to be opened out (bent away) and rolled flat as shown in FIG. 1. Preferably, the tread pattern 46 remaining on the tread portion 42 is also removed, substantially to the line 48 in FIG. 2, by buffing or an equivalent operation to obtain a smoother working surface than would otherwise be the case. This forms a tire part (belt portion) in the form of the strip 22.

The strip 24 of FIG. 1 is fabricated from a second tire in a similar manner and the resulting rim 50' with the first side 56 and second side 57 is shown in the view of FIG. 3B which is a view similar to FIG. 3A. After a cut along the transverse line 58' the rim 50' is opened out (bent away) and rolled flat to become the strip 24 shown in FIG. 1. The two inner (smooth) second side 55 and 57 have been mated and bonded creating a plank with buffed outer surfaces ideal for sound control.

Figure 4B:
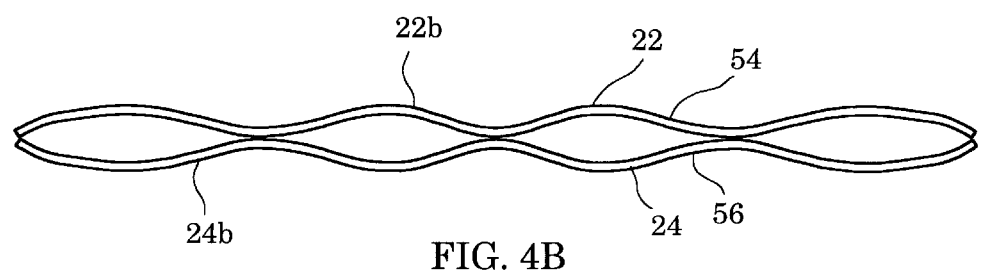
FIG. 4B is a view similar to FIG. 4A with tread strips 22, 24 fully extended showing multiple curvatures created in the extension process (unwrapping of a tire tread)
Figure 4C:
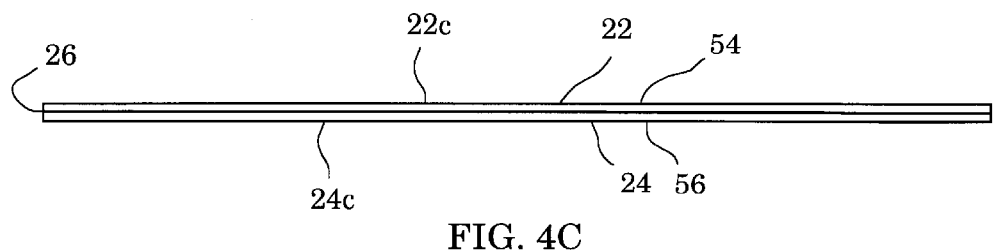
FIG. 4C is a view similar to FIG. 4A with tread strips 22, 24 compressed to press out the built-in curvatures.

FIGS. 4A, 4B and 4C are views along the line 4—4 of FIG. 1 showing successive longitudinal positions of the strips 22, 24 in the fabrication process leading to the final lamination of FIG. 1. The positions 22a, 24a of FIG. 4A result when the strips 22, 24 are bent away from the transverse cut lines 58, 58' of FIGS. 3A, 3B. The strips 22, 24 tend to retain the curvatures they had when they were parts of the tires from which they were manufactured. After the strips 22, 24 are pressed substantially flat they appear in the positions 22b, 24b of FIG. 4B. Because their inherent curvatures resist flattening, they form a rippled appearance. With increased pressure and integration with a bond along a bond line 26 they assume the final longitudinal positions 22c, 24c shown in FIG. 4C.

Figure 5A:
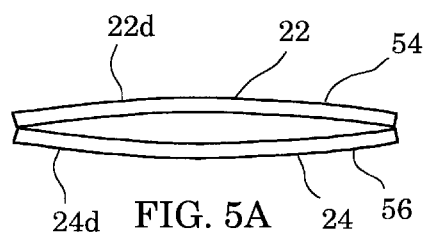
FIG. 5A is a view along the line 5—5 of FIG. 1 with tread strips 22, 24 positioned as in FIG. 4B showing an end view of the two concave surfaces which must be pressed out.
Figure 5B:
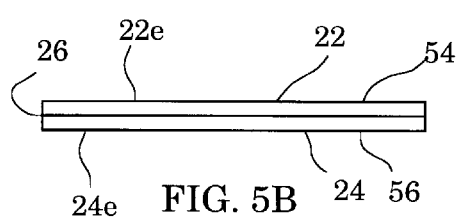
FIG. 5B is a view similar to FIG. 5A with tread strips 22, 24 compressed to eliminate the built in curvatures.

FIGS. 5A, 5B are views along the line 5—5 of FIG. 1 illustrating transverse positions of the strips 22, 24 in the fabrication process described above in the longitudinal views of FIGS. 4A, 4B, 4C. The strips 22, 24 have interim (curved) positions 22d, 24d in FIG. 5A before pressure and integration with a bond along a bond line 26 achieves the final transverse (flattened) positions 22e, 24e of FIG. 5B. The surfaces 54, 56 face outward, of course, in FIGS. 4A, 4B, 4C and FIGS. 5A, 5B.

Thus, in the plank 20 of FIG. 1, concave sides of the strips 22, 24 have been forced to abut over all of the concave sides and are then integrated with a bond. Restructuring the inherent built in transverse and longitudinal curvatures of 22, 24 with pressure during bonding produces a dynamic tension or equilibrium of forces which creates a new and unexpected stiffness in the resulting laminated plank 20 and the other structure embodiments of this disclosure.

Figure 6A:
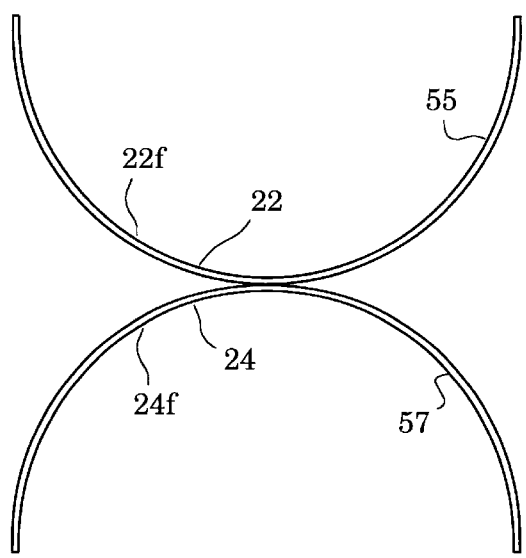
FIG. 6A is a view along the line 6—6 of FIG. 8 with tread strips 22, 24 partially opened out in the extension process.
Figure 6B:
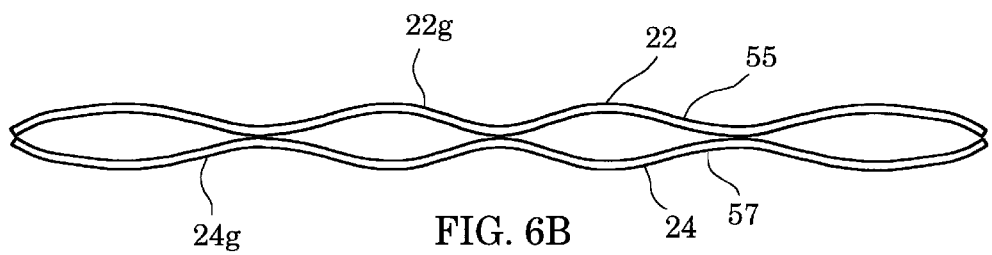
FIG. 6B is a view similar to FIG. 6A with tread strips 22, 24 fully extended showing the multiple curvatures created by such extension.
Figure 6C:
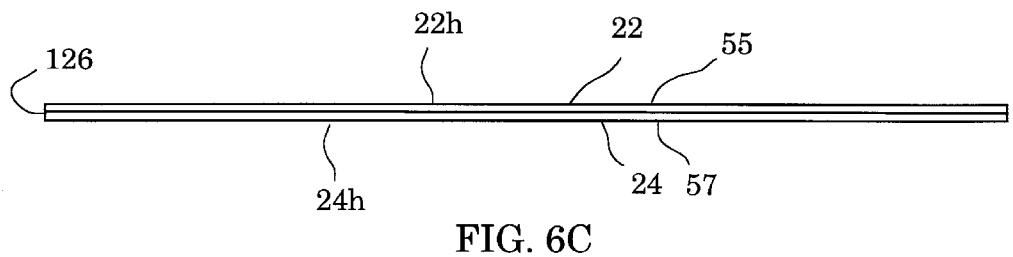
FIG. 6C is a view similar to FIG. 6A with tread strips 22, 24 compressed to press together and flatten the built-in curvatures.
Figure 7A:
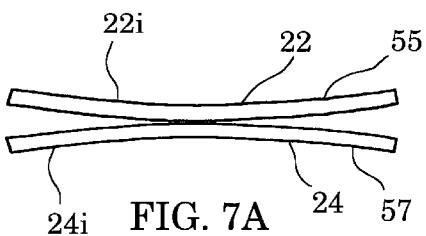
FIG. 7A is a view along the line 7—7 of FIG. 8 with tread strips 22, 24 positioned for bonding showing the two convex outer surfaces which must be pressed together in the process of bonding to make a plank.
Figure 7B:
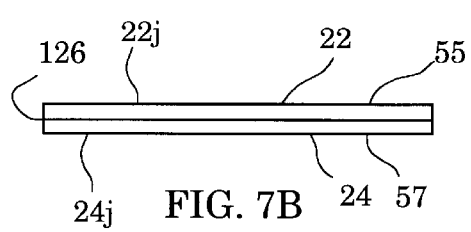
FIG. 7B is a view similar to FIG. 7A with tread strips 22, 24 compressed to eliminate the built-in curvatures for bonding into a flat plank.

FIGS. 6A, 6B and 6C illustrate similar longitudinal positions to those of FIGS. 4A, 4B and 4C when the surfaces 55, 57 (FIGS. 3A, 3B) face outward. The strips 22, 24 go through positions 22f, 24f in FIG. 6A and positions 22g, 24g in FIG. 6B before the final positions 22h, 24h of FIG. 6C. FIGS. 7A, 7B illustrate, for the configuration where surfaces 55, 57 face outward, similar transverse positions to FIGS. 5A, 5B. The strips 22, 24 have interim positions 22i, 24i in FIG. 7A before pressure and integration with a bond along a bond line 126 achieves the final transverse positions 22j, 24j of FIG. 7B.

Figure 8:
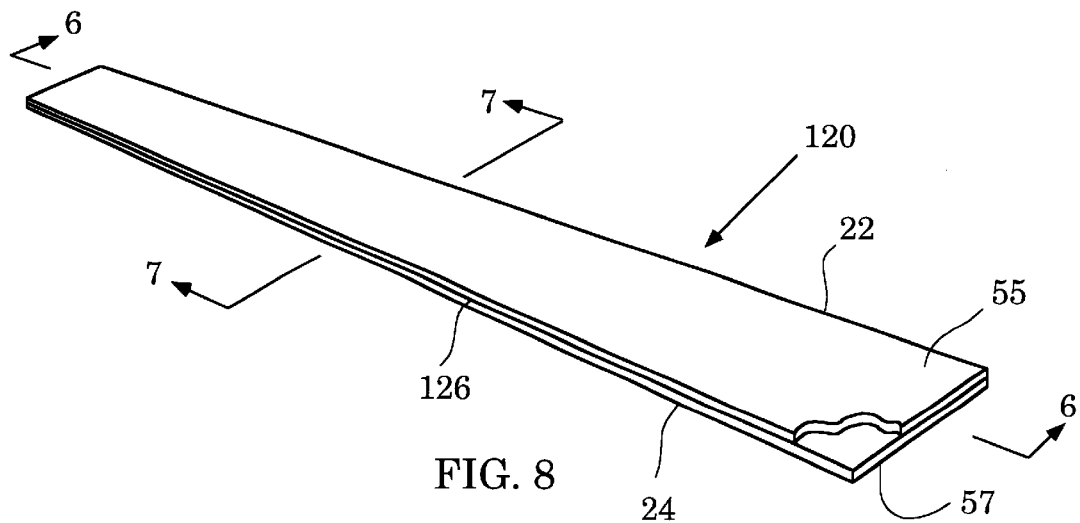
FIG. 8 is a perspective view of another lamination in the shape of a plank.

FIG. 8 is a view similar to FIG. 1 illustrating the lamination embodiment that results from the process described above in FIGS. 6A, 6B, 6C and FIGS. 7A, 7B. The plank 120 of FIG. 8 is similar to the plank 20 of FIG. 1 but has the smooth inner surfaces 55, 57 (see FIGS. 3A, 3B) facing outward. The strips 22, 24 are integrated with a bond along a bond line 126. As shown in FIG. 8, FIGS. 6A, 6B, 6C are views along the line 6—6 while FIGS. 7A, 7B are views along the line 7—7. Thus, in the plank 120 of FIG. 8, convex sides of the strips 22, 24 have been forced to abut over all of the convex sides and are then integrated with a bond. The smooth surfaces 55, 57 enhance the appearance of the plank. As stated above with reference to FIG. 1, such restructuring of the inherent built in transverse and longitudinal curvatures of 22, 24 with pressure during bonding produces a dynamic tension or equilibrium of forces which creates a new and unexpected stiffness in the resulting laminated plank 120 and the other embodiments of this disclosure.

Figure 9:
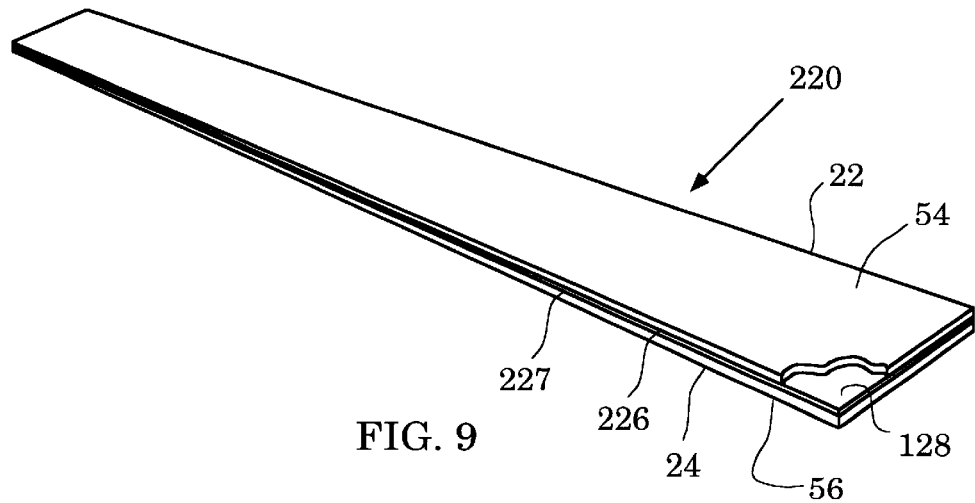
FIG. 9 is a perspective view of another lamination in the shape of a plank.

FIG. 9 is another view similar to FIG. 1 illustrating another preferred lamination fabricated with the methods of the invention in the plank 220. The plank 220 has a layer made of a part in the form of a strip 128 sandwiched between the strips 22 and 24 which have their surfaces 54, 56 (see FIGS. 3A, 3B) facing outward. The plank 220 has the other features of the plank 20 (FIG. 1).

Figure 10:
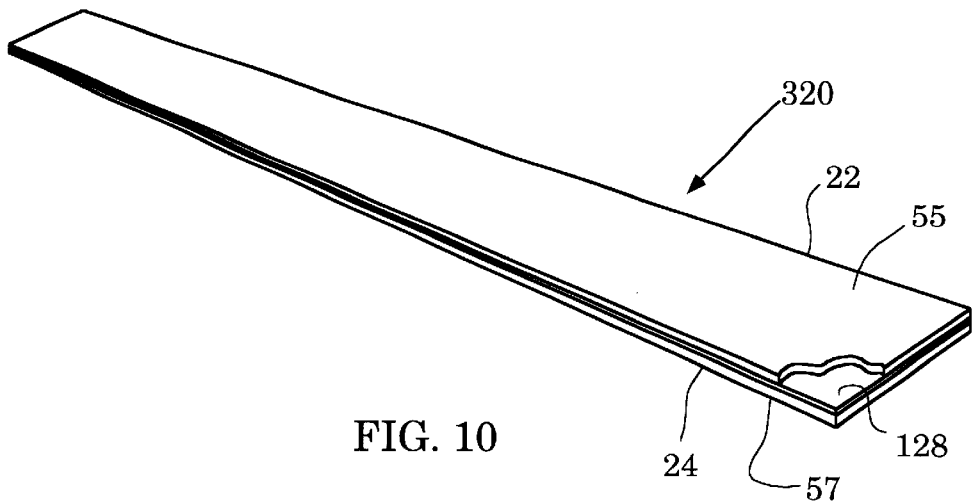
FIG. 10 is a perspective view of another lamination in the shape of a plank.

Another lamination fabricated in accordance with the invention is shown in FIG. 10, which is a view similar to FIG. 9, in the laminated plank 320. The plank 320 is formed with the strip 128 sandwiched between the strips 22, 24 with the surfaces 55, 57 of the strips 22, 24 facing outward.

The strip 128 in FIGS. 9, 10 is made from an unvulcanized rubber compound (e.g. Patch brand cushion gum sold by Patch Rubber Company, Roanoke Rapids, N.C., 27870). The strip 128 meets the strips 22, 24 along the bond lines 226, 227. The thickness of the strip 128 may be chosen to be compatible with the textures and thicknesses of the strips 22, 24. The plank 320 has the other features of the plank 220 (FIG. 9). All of the planks have the superior strength and durability of the highly engineered vehicle tires from which they have been crafted.

Figure 11:
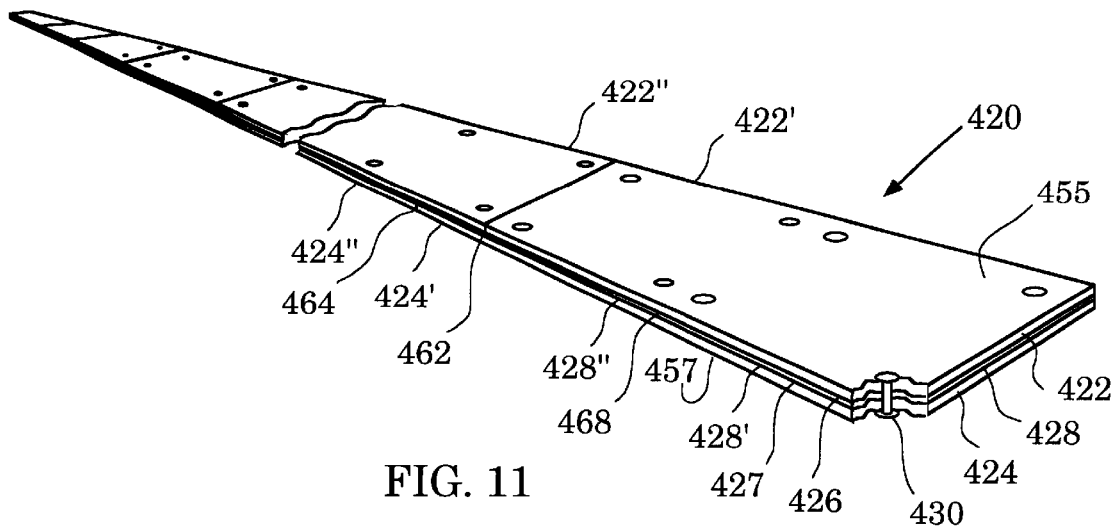
FIG. 11 is a perspective view of another lamination in the shape of a plank.

FIG. 11 is a perspective view illustrating another lamination fabricated in accordance with the invention in the plank 420. The plank 420 is similar to the planks 220, 320 in that it has three layers 422, 424 and 428. However, each layer is made up of a plurality of parts in the form of strips. The layer 422 has strips 422', 422" and so on while the layer 424 has strips 424', 424" and so on. The strips 422', 422", 424', 424" and so on are formed from pneumatic vehicle tires similar to the strips 22, 24 described with reference to FIG. 1. The layer 428 has strips 428', 428" and so on formed from unvulcanized rubber similar to the strip 128 described with reference to FIG. 9.

Preferably, the junctions 462, 464 and 468 between the strips of each layer 422, 424 and 428 are staggered so that an adjacent layer always bridges a junction. This feature of the laminated plank 420 adds to its strength and allows, as indicated in FIG. 11, for a plank of unlimited length to be manufactured with n number of strips in each layer 422, 424 and 428. The bond of the layers may be augmented by fasteners such as the rivets 430 which extend through the layers. The plank 420 has the other features of the planks 220, 320 (FIGS. 9, 10).

Preferred fabrication bond methods will now be described. One preferred bond embodiment which may be used, for example, in fabrication of the plank 220 (FIG. 9), is vulcanization in which the strips 22, 24 and 128 of the plank 220 are first cleaned on the surfaces that will be adjacent the bond lines 226, 227 with a cleaning agent (e.g. "AD-MILE" Special Solvent sold by Myers Tire Supply Company, Akron, Ohio, 44309). Next the cleaned surfaces of 22, 24 are sprayed with vulcanizing cement (e.g. AD-MILE PRE-CURE SPRAY CEMENT sold by Myers Tire Supply Company) and positioned on the bond lines 226, 227.

Starting at one end, these mated strips are then put under pressure in a progressive manner such as by rollers. This moving pressure front squeezes out trapped air and flattens the transverse and longitudinal curvatures thereby allowing the bonding process to lock in the equilibrium which has been referred to above as a dynamic tension of forces. The result is shown, in the case of the tire plank 20, in the positions 22c, 24c of FIG. 4C and the positions 22e, 24e of FIG. 5B.

Finally, the plank 220 is placed under pressure (in the range of 50 to 200 pounds per square inch) and temperature (in the range of 180 to 380 degrees Fahrenheit). The relative humidity is held below 30%. The plank 220 is maintained under these conditions between 20 to 80 minutes after which time the completed plank is removed from the vulcanization environment.

Another preferred integration method in accordance with the present invention is epoxy which may be especially suitable for embodiments lacking unvulcanized rubber (e.g. planks 20, 120 of FIGS. 1, 8). An exemplary two part epoxy is DEVCON, mixed and applied under well ventilated conditions and at temperatures between 50 and 110 degrees Fahrenheit. Pressure is applied as with the vulcanization described above. Epoxy hardens at room temperatures and formulas with set times from five minutes to thirty minutes are available.

Structure embodiments such as the planks 20, 120 may also be fabricated with a bond of adhesive (e.g. "SCOTCH-GRIP" #2141 from the 3M Company, Saint Paul, Minn., 55144) applied under conditions similar to those described above for epoxy. An even coat of adhesive should be applied to each mating surface and bonded while the adhesive is aggressively tacky. Pressure is applied as with the vulcanization described above. The pressure should be maintained for fifteen to forty five minutes to insure a straight flat plank, although bonds have good immediate strength for normal handling requirements.

Another preferred bond method, in accordance with the present invention, is chemical vulcanization. As an example of this fabrication, the strip 128 of FIG. 9 may be made from a chemical vulcanizing rubber compound (e.g. Patch brand "CHEM-BOND"). Mating surfaces of strips 22, 24 are sprayed with a chemical vulcanizing cement (e.g. "PATCH BOND" Chemical Cement). The strip 128 meets the strips 22, 24 along the bond lines 226, 227 and pressure is applied as described under vulcanizing above.

Pressure in the range of 50 to 150 pounds per square inch is used depending upon the thickness of the unvulcanized gum strip 128, the thickness of the strips 22, 24 and the degree of curvature to be pressed out. With chemical bonding the cure time is very short, substantially one minute or less and is carried out at room ambient temperature.

Figure 12:
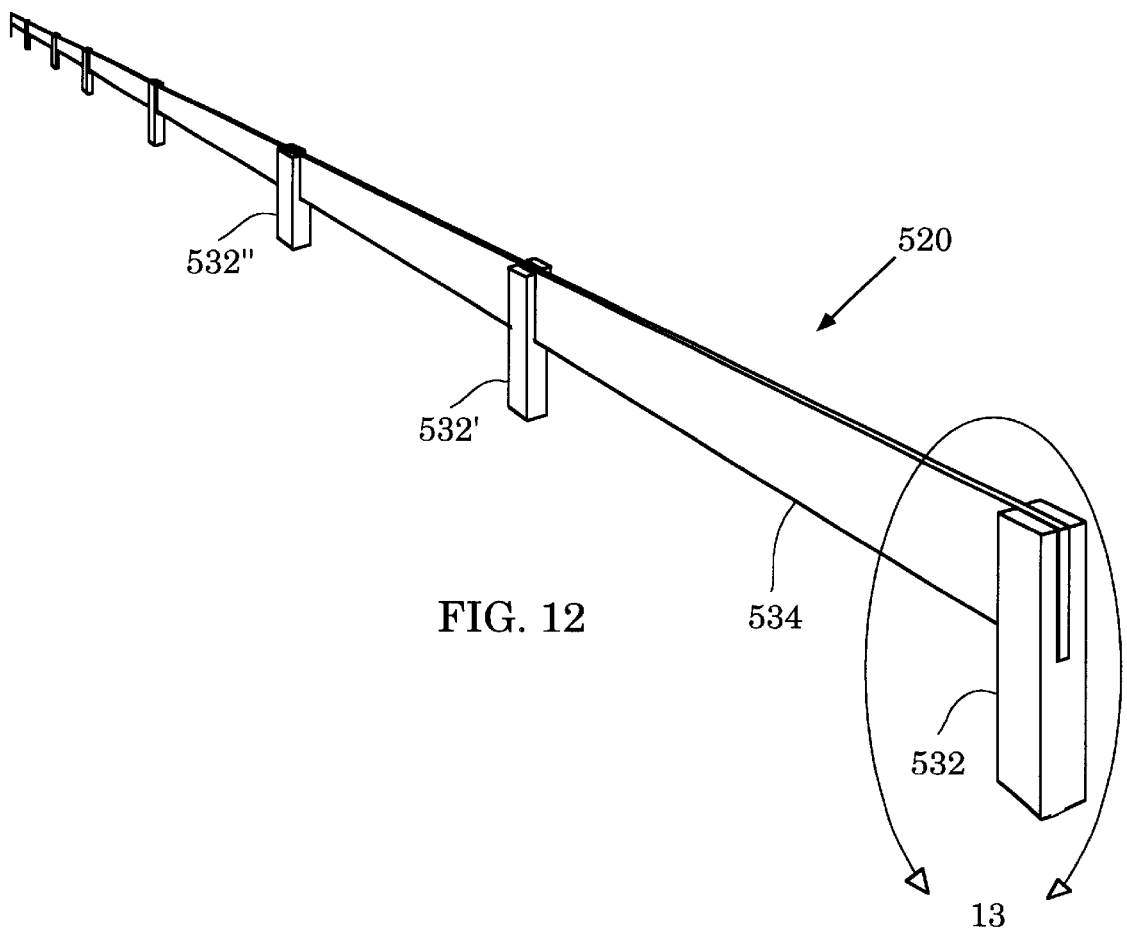
FIG. 12 is a perspective view of another lamination in the shape of a guard rail.
Figure 13:
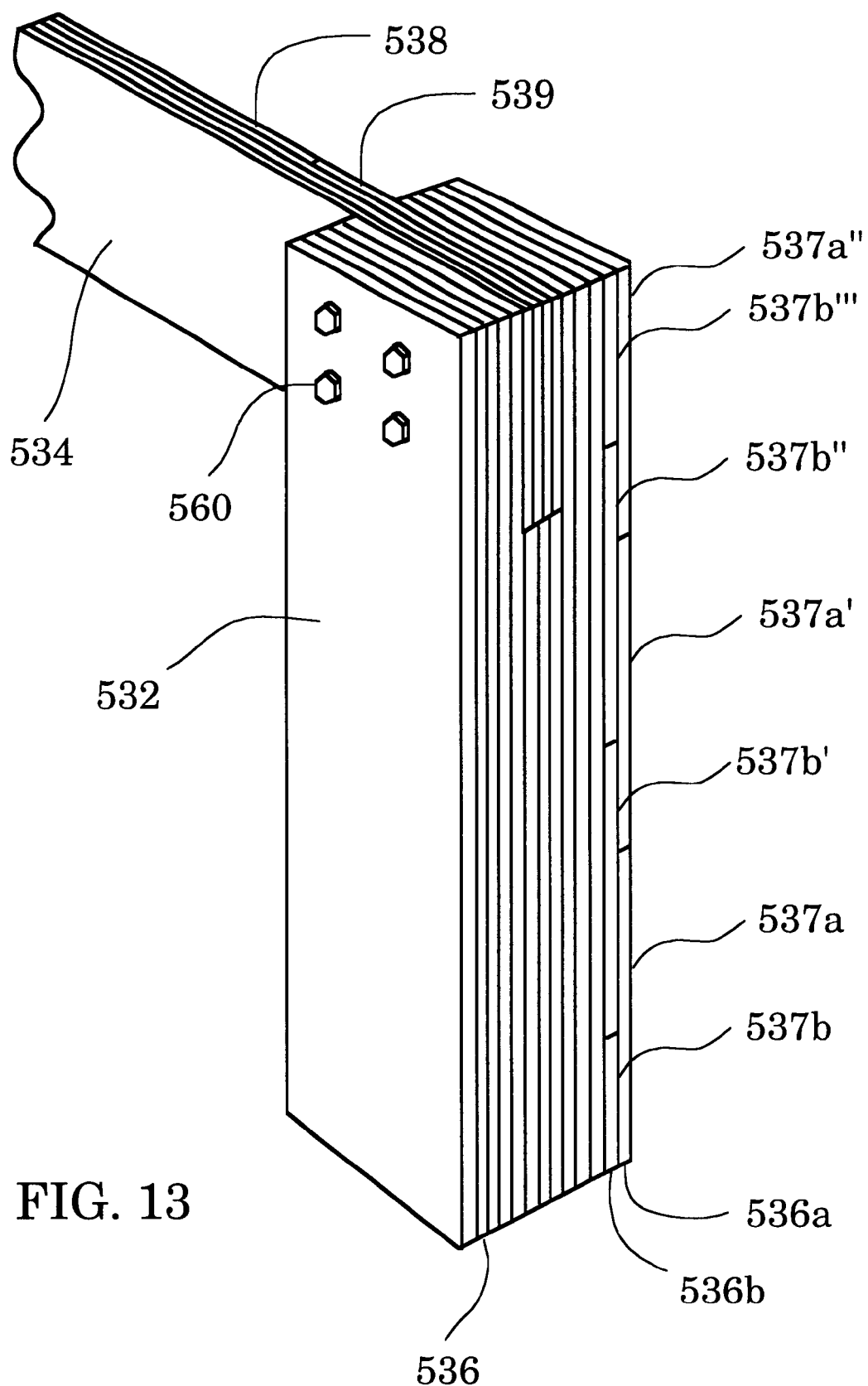
FIG. 13 is a view of the area enclosed by the line 13 of FIG. 12.

Other embodiments formed in accordance with the present invention illustrate how more complex laminations can be fabricated from elements and bonds disclosed above. For example, the guard rail 520 of FIG. 12 has a rail in the form of a laminated plank 534 which is similar in construction to the plank 420 in FIG. 11. The plank 534 is supported by laminated posts 532, 532', 532" and so on. FIG. 13 is a perspective view of the area within the line 13 of FIG. 12 and illustrates how the posts 532, 532', 532" and so on are fabricated of layers 536 and the plank 534 is fabricated of layers 538. The layers 536, 538 are integrated with a bond at the layer interfaces. Layers of unvulcanized rubber alternate with layers cut from tires as in the plank 420 in FIG. 11.

The layers 536 that make up the post 532 are in turn made up of parts such as the strips 537a, 537a' and 537a" of the layer 536a and the strips 537b, 537b', 537b" and 537b''' of the layer 536b. The layers 538 are made up of parts such as the strip 539. The remaining layers 536 and layers 538 are made up of similar strips. The junction of the posts 532, 532', 532" and so on with the plank 534 may also be strengthened with fasteners such as the bolts 560. Posts of construction similar to the post 532 may be fabricated individually for use wherever posts are needed such as places where strength, long life, and ecologically benign posts are called for.

Figure 14:
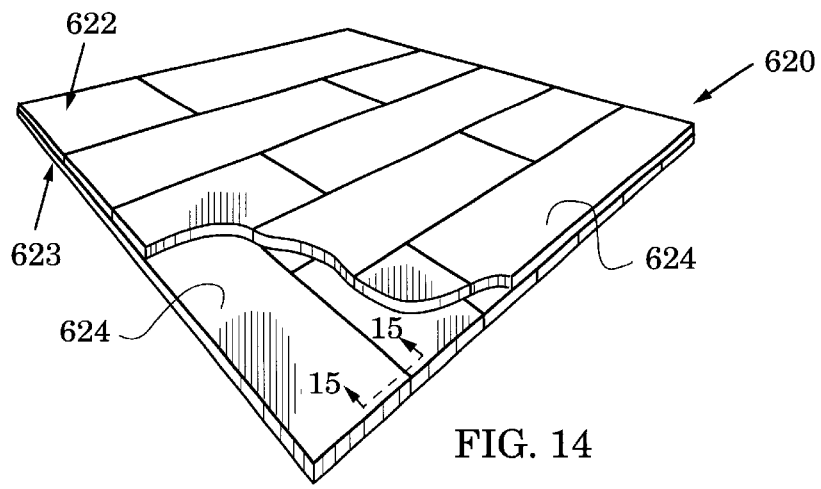
FIG. 14 is a perspective view of another lamination in the shape of a panel.

Another complex lamination is illustrated in the panel 620 of FIG. 14 which includes a top sheet 622 and a bottom sheet 623. Each sheet is made up of strips 624 similar to the strips 22, 24 of FIGS. 1 and 8. A plurality of strips 624 are arranged to abut along their edges (i.e. in an edge abutting relationship) to form each of the sheets 622, 623 with the strips of one sheet 622 arranged in an overlapping side abutting relationship with the strips of the adjoining sheet 623. It should be understood that the overlapping portion may include all of a strip.

In the panel 620 the strips of one sheet 622 are also arranged with their longitudinal orientation rotated (specifically 90° in FIG. 14 but generally any angle) relative to the longitudinal orientation of the strips of the other sheet 623 (i.e arranged in longitudinally rotated relationship). The two sheet (622, 623) arrangement shown in FIG. 14 can be extended to laminations of multiple sheets to form a panel of any desired thickness and strength.

The panel 620 may be bonded together with either the epoxy or the adhesive bond embodiment described above. Although the panel 620 is shown arranged to define a plane, it should be understood that such panels may be fabricated in a similar manner to define other useful structural shapes (e.g. cylinders, arcs, bent planes). It should also be understood that structural elements such as the panel 620 may require some or all strips of the lamination to be trimmed into smaller shapes than the tread portion first removed from a tire. As in other embodiments shown above, the strips are forced to contact each over substantially all of their adjoining surfaces.

Figure 15A:
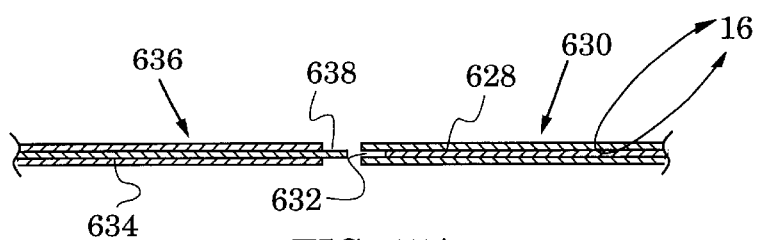
FIG. 15A is a sectional view along the plane 15—15 of FIG. 14.

Structures such as the panel 620 may also be fabricated, in accordance with the present invention, to form the embodiment shown in FIG. 15A which is a view along the plane 15—15 of FIG. 14. In this view each strip 624 of FIG. 14 is, instead, a plank made up of three strips in a manner similar to that illustrated in FIGS. 9, 10 but with the center strip 628 recessed in one plank 630 to define a groove 632 and the center strip 634 extended in the other plank 636 to define a tongue 638.

Figure 15B:
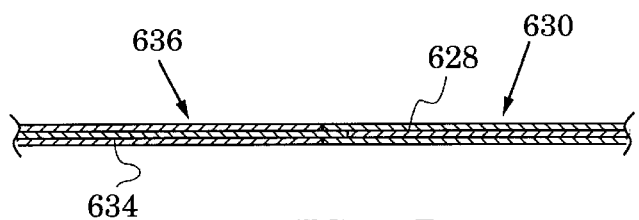
FIG. 15B is a view similar to FIG. 15A.

In FIG. 15A the planks are separated for clarity of illustration. When the strips are arranged with the tongue 638 received in the groove 632 (i.e. arranged in an edgewise tongue and groove relationship) and bonded together as in FIG. 15B, the structure adds additional strength to a panel (or other shape) fabricated therefrom. A preferred tongue extension is approximately ¾ inch. The center strips 628, 634 interleaved between outer strips (i.e. arranged in interleaved relationship) may be fabricated from uncured rubber compounds (as in FIGS. 9, 10) in which case the panel can be integrated by vulcanization. While FIG. 15A illustrates a tongue and groove relationship along the long dimensions of the strips 624, the tongue and groove relationship can also be along the strip ends.

Figure 15C:
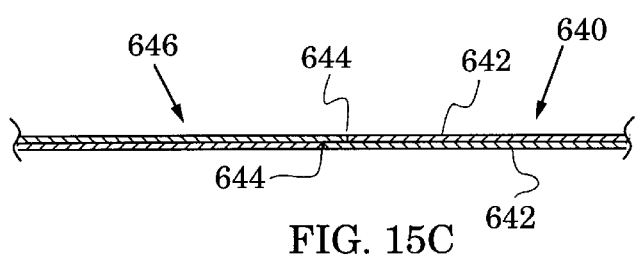
FIG. 15C is a view similar to FIG. 15A.

Each strip of FIG. 14 may also be fabricated as shown in FIG. 15C with planks 640 each made up of two strips 642 in a manner similar to that illustrated in FIGS. 1, 8 but arranged with the strip edges 644 in an edgewise offset relationship to enhance the structural strength.

Figure 16:
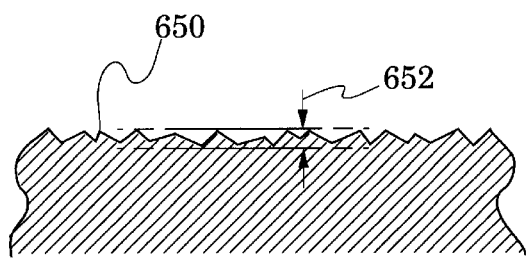
FIG. 16 is a view of the surface within the line 16 of FIG. 15A.

As shown in FIG. 16, which is an enlarged view of the surface within the line 16 of FIG. 15, lamination surfaces may be abraded to enhance their ability to reduce sound reflections. It has been found that roughening the surface (e.g. with a wire brush) to produce irregularities 650 having an average depth 652 of 2 millimeters significantly increases the sound absorption of the panel face From the foregoing it should now be recognized that lamination embodiments suitable for using parts fabricated from rubber tires to form structural elements have been disclosed herein. Although the teachings of the present invention can be practiced with any type of pneumatic vehicle tire, the use of steel belted radial tires enhances the strength and durability of the laminations.

The preferred embodiments disclosed herein are exemplary and numerous modifications, dimensional variations, and rearrangements can be readily envisioned to achieve an equivalent result, all of which are intended to be embraced within the scope of the appended claims.

What is claimed is:

1. A method of manufacturing laminated structures comprising the steps of:

cutting a plurality of pieces from the tread portion of pneumatic vehicle tires;

removing the tread pattern from said pieces to form a plurality of tire parts, said parts retaining their inherent tire curvature to define a concave inner side and a convex outer side;

arranging at least one of said parts in a first layer;

arranging at least one of said parts in a second layer;

pressing said first and second layers together to remove all voids therebetween; and integrating said first and second layers with a bond therebetween to form a laminated structure;

wherein said pressing step is preceded by the steps of:

arranging the concave inner side of each first layer part to face a common first side of said first layer;

arranging the concave inner side of each second layer part to face a common first side of said second layer; and positioning said first and second layers with their first sides facing away from each other.

2. The method of claim 1 wherein said bond is epoxy.

3. The method of claim 1 wherein said bond is adhesive.

4. A method of manufacturing laminated structures, comprising the steps of:

cutting a plurality of pieces from the tread portion of pneumatic vehicle tires;

removing the tread pattern from said pieces to form a plurality of tire parts, said parts retaining their inherent tire curvature to define a concave inner side and a convex outer side;

arranging at least one of said parts in a first layer;

arranging at least one of said Parts in a second layer;

pressing said first and second layers together to remove all voids therebetween; and integrating said first and second layers with a bond therebetween to form a laminated structure;

wherein said pressing step is preceded by the steps of:

arranging the concave inner side of each first layer part to face a common first side of said first layer;

arranging the concave inner side of each second layer part to face a common first side of said second layer; and positioning said first and second layers with their first sides facing the same direction.

5. The method of claim 4 wherein said bond is epoxy.

6. The method of claim 4 wherein said bond is adhesive.

* * * * *